(12) United States Patent
Saxton et al.

(10) Patent No.: US 9,657,777 B2
(45) Date of Patent: May 23, 2017

(54) WEAR RESISTANT LEAD FREE ALLOY BUSHING AND METHOD OF MAKING

(71) Applicant: Federal-Mogul Corporation, Southfield, MI (US)

(72) Inventors: David Saxton, Ann Arbor, MI (US); James Carpenter, Willis, MI (US); Gregory Sevenski, Farmington, MI (US); Holger Schmitt, Hessen (DE); Gerd Andler, Hessen (DE)

(73) Assignee: Federal-Mogul LLC, Southfield, MI (US)

( * ) Notice: Subject to any disclaimer, the term of this patent is extended or adjusted under 35 U.S.C. 154(b) by 384 days.

(21) Appl. No.: 14/223,513

(22) Filed: Mar. 24, 2014

(65) Prior Publication Data

US 2014/0272128 A1    Sep. 18, 2014

Related U.S. Application Data

(62) Division of application No. 11/830,913, filed on Jul. 31, 2007, now Pat. No. 8,679,641.

(Continued)

(51) Int. Cl.
*B22F 7/08*    (2006.01)
*F16C 33/14*   (2006.01)
(Continued)

(52) U.S. Cl.
CPC .............. *F16C 33/14* (2013.01); *B22F 7/08* (2013.01); *C22C 1/0425* (2013.01); *C22C 9/02* (2013.01);
(Continued)

(58) Field of Classification Search
None
See application file for complete search history.

(56) References Cited

U.S. PATENT DOCUMENTS 3,014,884 A    12/1961  Bray
4,334,926 A     6/1982  Futamura et al.
(Continued)

FOREIGN PATENT DOCUMENTS

EP    0681035 A2    11/1995
EP    0962541 A1    12/1999
(Continued)

*Primary Examiner* — Jessee Roe
*Assistant Examiner* — Ngoclan T Mai
(74) *Attorney, Agent, or Firm* — Robert L. Stearns; Dickinson Wright, PLLC

(57) ABSTRACT

A bearing having improved wear resistance has a bearing material of a copper-tin-bismuth alloy which may also include phosphorus which has excellent strength, due to the solid solution of copper, tin and phosphorus (when used), attached to a steel backing shell. The material also has good lubricity as a result of the presence of the bismuth which also promotes tin mobilization and formation of a layer of tin on the bearing surface upon use of the bearing. The addition of small amounts of relatively small hard particles in the copper-tin-matrix, particularly $Fe_3P$, $MoSi_2$ or a mixture thereof, provides a suitable hard surface artifact to improve the wear resistance of the bearing material. The bearing includes a sintered powder compact bearing material of a copper-tin-bismuth alloy powder and a metal compound powder which is bonded to a steel backing shell, wherein the metal compound powder has an average particle size of less than 10 μm.

14 Claims, 8 Drawing Sheets

Related U.S. Application Data

(60) Provisional application No. 60/883,636, filed on Jan. 5, 2007, provisional application No. 60/883,643, filed on Jan. 5, 2007.

(51) Int. Cl.

| | | |
|---|---|---|
| *C22C 1/04* | (2006.01) | |
| *C22C 9/02* | (2006.01) | |
| *C22C 32/00* | (2006.01) | |
| *F16C 33/12* | (2006.01) | |

(52) U.S. Cl.
CPC ...... *C22C 32/0021* (2013.01); *C22C 32/0047* (2013.01); *F16C 33/121* (2013.01); *B22F 2998/10* (2013.01); *F16C 2204/10* (2013.01); *F16C 2204/12* (2013.01); *Y02T 10/865* (2013.01); *Y10T 428/1209* (2015.01); *Y10T 428/12014* (2015.01); *Y10T 428/12049* (2015.01); *Y10T 428/12056* (2015.01); *Y10T 428/12063* (2015.01)

(56) References Cited

U.S. PATENT DOCUMENTS

| | | |
|---|---|---|
| 5,045,405 A | 9/1991 | Koroschetz et al. |
| 5,114,468 A | 5/1992 | Akutsu et al. |
| 5,217,814 A | 6/1993 | Kawakami et al. |
| 5,306,465 A | 4/1994 | Caron et al. |
| 5,370,840 A | 12/1994 | Caron et al. |
| 5,441,555 A | 8/1995 | Matthews et al. |
| 5,486,244 A | 1/1996 | Caron et al. |
| 5,565,045 A | 10/1996 | Caron et al. |
| 5,589,652 A | 12/1996 | Arato et al. |
| 5,601,665 A | 2/1997 | Caron et al. |
| 5,637,132 A | 6/1997 | Matthews et al. |
| 5,824,923 A | 10/1998 | Kondoh et al. |
| 5,938,864 A | 8/1999 | Tomikawa et al. |
| 6,025,081 A | 2/2000 | Ohshiro et al. |
| 6,149,739 A | 11/2000 | Smith |
| 6,165,246 A | 12/2000 | Kira et al. |
| 6,178,639 B1 | 1/2001 | Lytwynec et al. |
| 6,254,701 B1 * | 7/2001 | Oshiro ............... B22F 7/04 148/281 |
| 6,267,508 B1 | 7/2001 | Bank et al. |
| 6,312,579 B1 | 11/2001 | Bank et al. |
| 6,334,914 B2 | 1/2002 | Sakai et al. |
| 6,602,615 B2 | 8/2003 | Sakai et al. |
| 6,746,154 B2 | 6/2004 | Greene et al. |
| 6,767,648 B2 | 7/2004 | Saitou et al. |
| 6,770,381 B2 | 8/2004 | Kanayama et al. |
| 6,787,100 B2 | 9/2004 | Toth |
| 6,854,183 B2 | 2/2005 | Greene et al. |
| 6,905,779 B2 | 6/2005 | Sakai et al. |
| 6,997,612 B2 | 2/2006 | Kawachi et al. |
| 2002/0031684 A1 | 3/2002 | Niegel et al. |
| 2003/0026715 A1 | 2/2003 | Ojima et al. |
| 2003/0068106 A1 * | 4/2003 | Greene ............... B22F 7/04 384/279 |
| 2004/0111892 A1 | 6/2004 | Greene et al. |
| 2004/0161625 A1 * | 8/2004 | Sakai ............... B22F 1/0003 428/553 |
| 2006/0000527 A1 | 1/2006 | Yokota et al. |
| 2006/0013719 A1 | 1/2006 | Ichikawa et al. |
| 2006/0063019 A1 | 3/2006 | Kraemer et al. |
| 2006/0120645 A1 | 6/2006 | Toth et al. |
| 2007/0134508 A1 | 6/2007 | Pratt |
| 2008/0159671 A1 | 7/2008 | Leonardelli |
| 2009/0305916 A1 | 12/2009 | Mergen |

FOREIGN PATENT DOCUMENTS

| | | |
|---|---|---|
| EP | 1605069 A1 | 12/2005 |
| EP | 1716343 | 11/2006 |
| GB | 235563 A | 2/1926 |
| GB | 2312679 A | 11/1997 |
| GB | 2355016 A | 4/2001 |
| GB | 2374086 A | 10/2002 |
| GB | 2380772 A | 4/2003 |
| JP | 57073147 | 5/1982 |
| JP | 2194134 | 7/1990 |
| JP | 3006342 | 1/1991 |
| JP | 7150273 | 6/1995 |
| JP | 7310133 | 11/1995 |
| JP | 8053725 | 2/1996 |
| JP | 8283889 | 10/1996 |
| JP | 11269580 A | 10/1999 |
| JP | 2001081523 A | 3/2001 |
| JP | 2001240925 A | 9/2001 |
| JP | 2002235742 A | 8/2002 |
| JP | 2003194061 A | 7/2003 |
| JP | 2003231931 A | 8/2003 |
| JP | 2005030513 A | 2/2005 |
| JP | 2005505688 A | 2/2005 |
| JP | 2005200703 A | 7/2005 |
| JP | 2005350722 A | 12/2005 |
| JP | 2007270893 A | 10/2007 |
| WO | WO-9920806 A1 | 4/1999 |
| WO | WO-2008018348 A1 | 2/2008 |
| WO | WO-2009017501 A1 | 2/2009 |

* cited by examiner

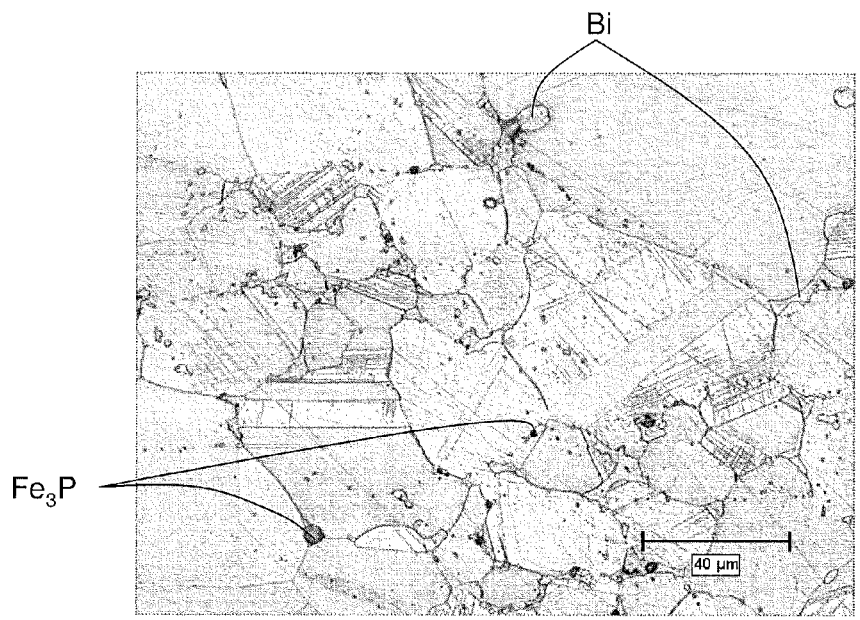
FIG - 9
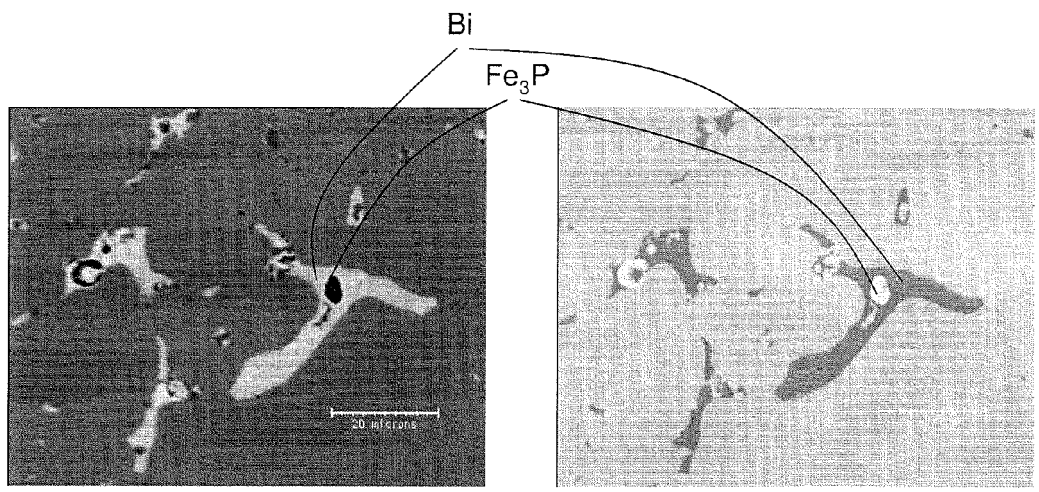
FIG - 10  FIG - 11

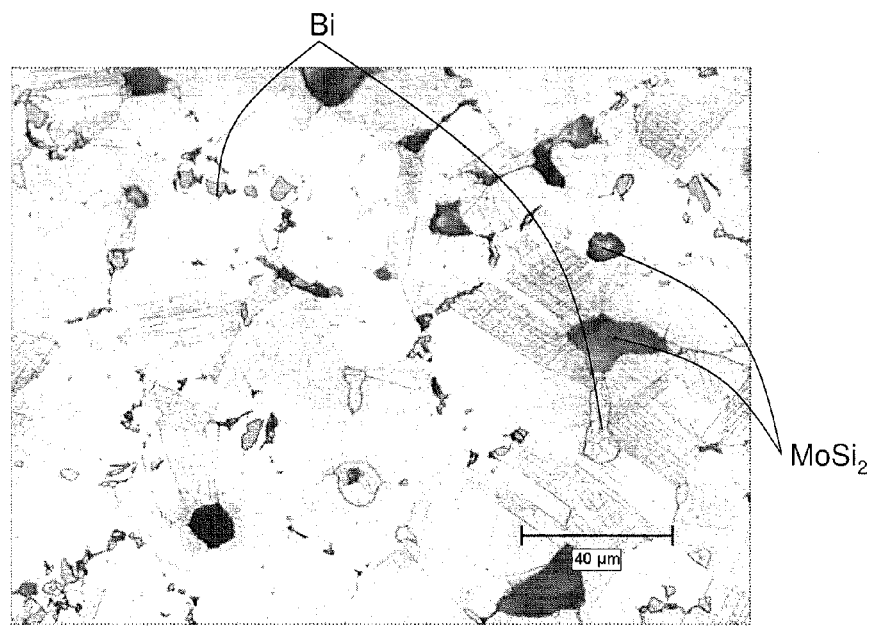
FIG - 12
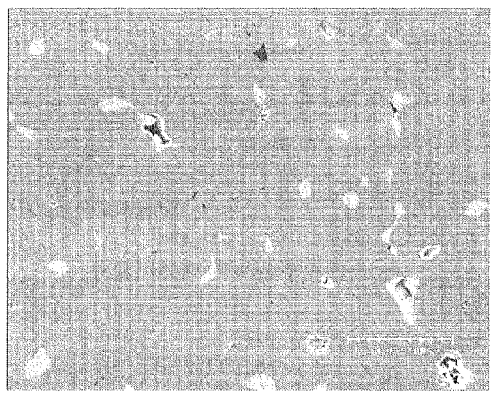 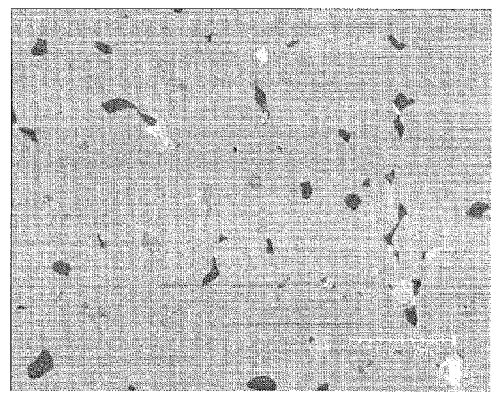
FIG - 13  FIG - 14

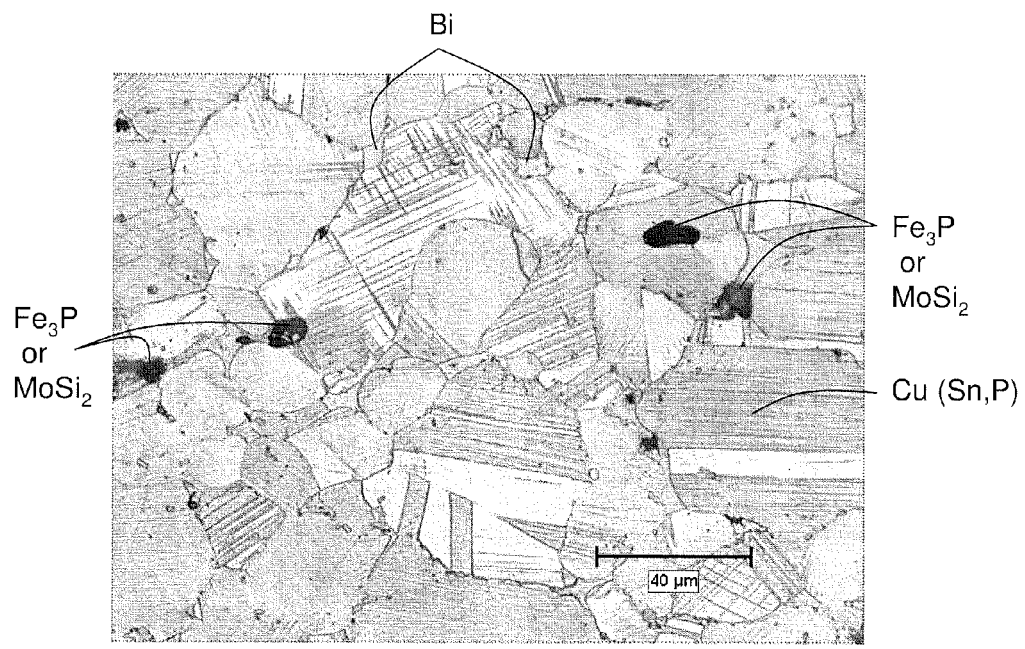
FIG - 15
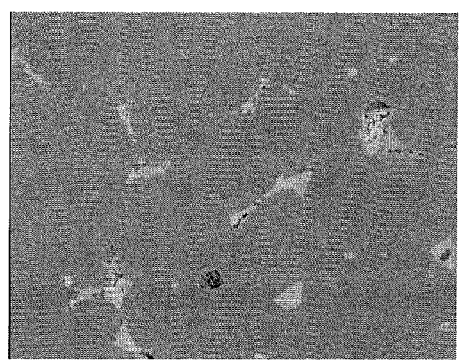 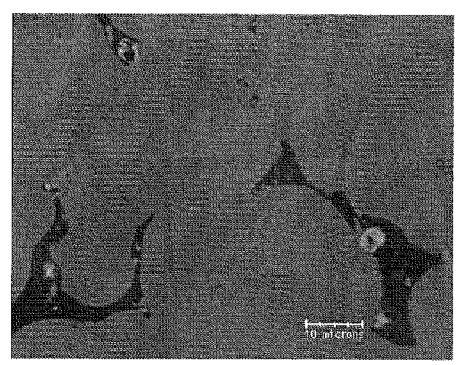
FIG - 16   FIG - 17

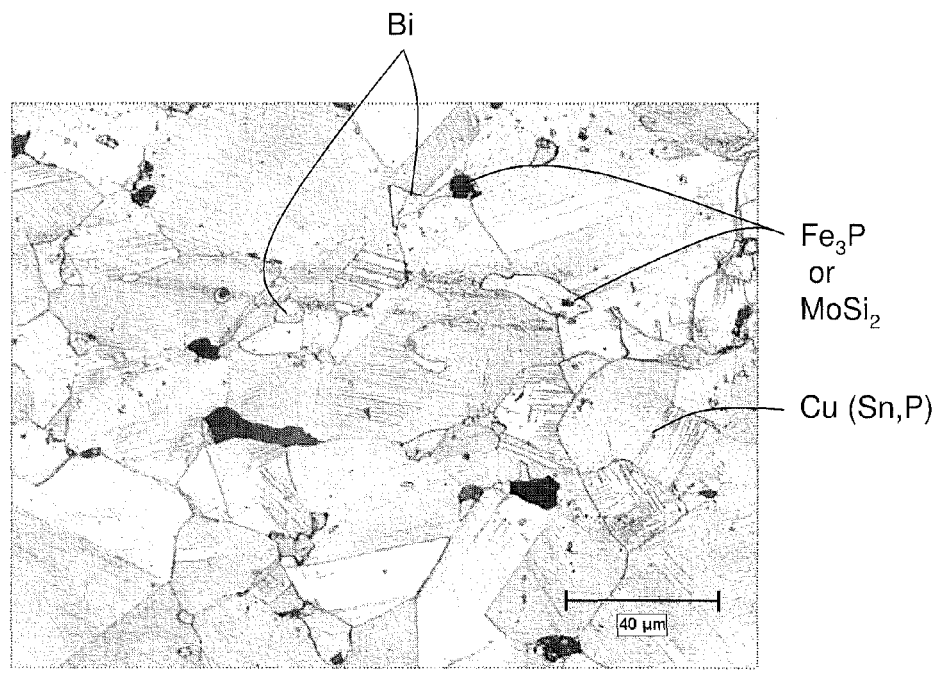
FIG - 18
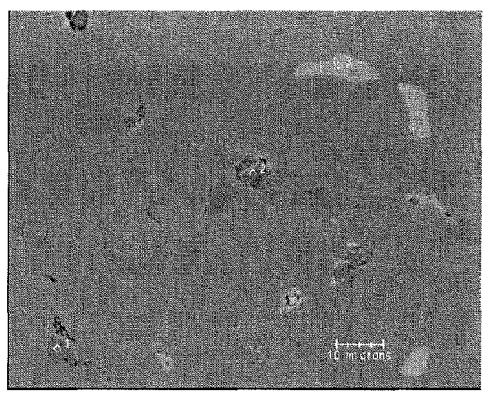  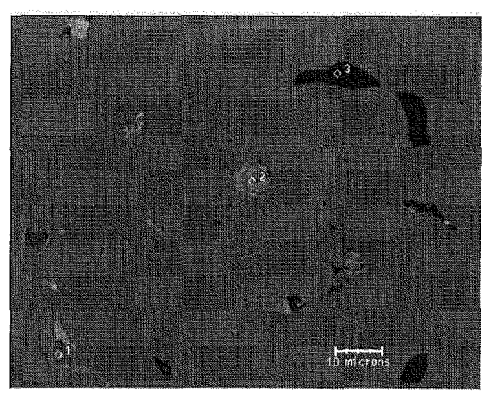
FIG - 19  FIG - 20

WEAR RESISTANT LEAD FREE ALLOY BUSHING AND METHOD OF MAKING

CROSS REFERENCE TO RELATED APPLICATIONS

This divisional patent application claims priority to U.S. Utility patent application Ser. No. 11/830,913, filed Jul. 31, 2007, now U.S. Pat. No. 8,679,641 and U.S. Provisional Patent Application Ser. Nos. 60/883,636 and 60/883,643 which were both filed on Jan. 5, 2007, and which are hereby incorporated herein by reference in their entirety.

BACKGROUND OF THE INVENTION

Field of the Invention

This invention relates generally to sliding-type bearings, and more particularly to those having a sintered powder metal bronze bearing material applied to a steel backing, such as used in engine bearings.

Related Art

It is common in sliding bearing applications, including engine bearings, to bond a powder metal bronze alloy to a steel backing to journal a crankshaft or the like. The copper tin alloy matrix provides a strong bearing surface that can withstand the loads subjected on the bearing in use. Such bearings must also exhibit suitable wear and seizure resistance properties, and for this purpose it is common to add a certain additional alloying constituents, including lead to the bronze matrix. Lead acts as a lubricant to the bearing surface. It is also common to add a thin coating of tin to the bearing surface to further enhance the wear and seizure characteristics of the bearing.

Due to environmental considerations, various substitutes for lead have been explored, but to date none have demonstrated the ability to truly substitute for lead without unduly sacrificing the strength, wear, seizure and various other properties in many sliding bearing applications, including engine bearings.

Applicants' have found that bismuth, when prealloyed with powder metal bronze in a controlled amount along with a controlled amount of phosphorus can be sintered and bonded to a steel backing to provide a resultant sintered bronze steel-backed engine bearing whose physical properties are equal to or better than that of bronze-lead bearings while also exhibiting wear and seizure resistant properties equal to or exceeding those of steel-backed powder metal bronze-lead engine bearings.

An engine bearing constructed according to the Applicant's own prior invention (namely U.S. Pat. No. 6,746,154) comprises an essentially lead-free bronze powder metal bearing material bonded to a steel backing. The bearing material consists essentially of 8 to 12% by weight of tin, 1 to less than 5% by weight of bismuth, and 0.03 to 0.8% by weight of phosphorus, with the balance being made up essentially of copper.

Bronze-bismuth-phosphorus engine bearings constructed according to the prior invention exhibit physical properties of tensile strength greater than or equal to 400 MPa, yield strength greater than or equal to 290 MPa, elongation greater than or equal to 10% and hardness greater than or equal to 130 Hv 0.5/15. By way of comparison, a traditional copper-tin-lead bearing having 10 wt. % tin, and 10 wt. % lead exhibits, on average, a considerably lower yield strength of 223 MPa, a comparable tensile strength of 301 MPa, a reduced elongation of about 8%, and a reduced hardness of about 96 HV 0.5/15. By way of further comparison, an identical engine wear test was conducted on bronze-bismuth-phosphorus bearings prepared according to the prior invention against more traditional copper-tin-lead bearings of the type described above. The more traditional copper-tin-lead engine bearings exhibited a loss of about 12 microns due to wear, whereas bearings prepared according to the invention exhibited an average of about 10-11 microns, demonstrating that the wear and seizure resistance of bearings according to the invention are at least as good, if not better than that of the traditional copper-tin-lead engine bearings.

It has been surprisingly found that bearings prepared according to the Applicant's prior invention exhibit the beneficial property, when subjected to frictional sliding loading in use, of having a certain amount of tin, which is in solid solution with the copper migrate to the bearing surface, with the result being that a tin-rich layer is formed at the bearing surface which was not present after sintering or prior to installation and use of the bearing. This migration of tin and formation of a highly tin-rich layer at the bearing surface greatly increases the lubricity of the bearing and thus contributes to enhanced wear and seizure resistant characteristics of the bearing once the bearing is put into use. Such tin migration has not been observed in traditional copper-tin-lead bearings, nor with other proposed lead substitutes, such as nickel. While not entirely understood, it is believed that, when subjected to frictional sliding loading, the bismuth reacts with the tin in the matrix and effectively mobilizes the tin, drawing it to the bearing surface. Following testing, a visual inspection of the engine bearings prepared according to the invention showed the bearing surface to have a lustrous, tin-colored bearing surface, and a chemical analysis conducted on the bearing showed a considerably higher concentration of tin at the surface than in portion of the copper-tin matrix below the surface, which remained uniform in its tin concentration.

This surprising property of tin migration has the benefit of eliminating or minimizing the need to apply a tin flash coating to the bearing surface prior to putting the bearing into service. The elimination of the flash coating step saves time and equipment and simplifies as well as lowers the cost of making engine bearings.

The elimination of lead from the engine bearings has the advantage of providing a more environmentally compliant engine bearing, and the substitution thereof with bismuth in the manner called for by the Applicant's prior invention has the advantage of providing the same or better strength and wear/seizure resistant properties without requiring substantial changes in the way engine bearings are made. As such, engine bearings prepared according to the prior invention are readily adaptable to new applications or existing applications that would otherwise call for copper-tin-lead bearings, and a manufacturer of bearings according to the invention can adapt to the making of such bearings without requiring new or substantially modified manufacturing equipment, and perhaps eliminate some of the steps and equipment normally associated with the manufacture of traditional copper-tin-lead bearings.

According to a further aspect of the Applicant's prior invention (U.S. Pat. No. 6,746,154), particular benefits have been realized when a copper-tin-bismuth sintered compact is produced from a blend of water-atomized copper-bismuth powder and gas-atomized copper-tin powder. Again, while not entirely understood, it is believed that the process by which the powders are made contributes to the mobilization of the tin onto the bearing surface.

Other related art of notable mention may include U.S. Pat. No. 6,905,779 assigned to Daido Metal Company, Ltd. This patent is directed toward improved seizure resistance while unconcerned in any way with alloys containing bismuth or issues associated with wear resistance during the break-in period. Here, a mechanical alloying technique is used to achieve a uniform hard particle distribution in the material composition.

Still other related art includes GB2355016A assigned to Daido Metal Company Ltd. which teaches a copper alloy that comprises 0.5-15 mass % tin, 1-20 mass % bismuth and 0.1-10 volume % hard particles having an average size of 1-45 μm. The bismuth exists as a bismuth phase dispersed through the alloy. The hard particles may comprise one or more of borides, silicides, oxides, nitrides, carbides and/or an intermetallic compound. The alloy may further comprise not more than 40 mass % of Fe, Al, Zn, Mn, Co, Ni, Si and/or P. It may also further comprise not more than 20 volume % of one or more of $MoS_2$, $WS_2$, BN and graphite. The bearing alloy material is made by sintering an admixture of pure copper, tin and bismuth powders and various hard particle powders. This patent teaches that the hard particles mentioned co-exist with the bismuth phase in the copper matrix. The size of the bismuth phase is generally larger than the diameter of the hard particles, as the particles are located in the bismuth phase.

Still other related art includes US 2006/0000527 assigned to Taiho Kogyo Co. Ltd. which teaches a Cu—Bi based alloy, which can simultaneously attain a high level of the compatibility, fatigue resistance and corrosion resistance required for the bearing of a fuel injection pump. The '527 patent teaches a lead-free bearing, which contains from 1 to 30 mass % of Bi and from 0.1 to 10 mass % of hard particles having from 10 to 50 μm average particle diameter, the balance being Cu and unavoidable impurities, and further the Bi phase dispersed in the Cu matrix has an average particle diameter smaller than that of the hard particles. The Cu—Bi alloy is pulverized by an atomizing method. The resultant Cu—Bi powder is mixed with hard-particle powder and powder of the other metallic components. The components other than the hard-particle powder may be in the form of an alloy powder prepared by the atomizing method. The hard particles may be carbides such as $Cr_2C_3$, $Mo_2C$, WC, VC and NbC, and preferably $Fe_2P$, $Fe_3P$, FeB, $Fe_2B$, and $Fe_3B$.

Notwithstanding the advantages associated with the use of copper-tin-bismuth bearing materials as described in U.S. Pat. No. 6,746,154, occasional early bushing wear may be experienced when using sintered bushings made from the composition. Such wear problems typically manifest during the initial break-in period of service. Despite the uses of certain combinations of hard particles suggested above, further bearing material improvements are desirable, particularly to improve wear and seizure resistance of the bearing, including early wear and seizure resistance, while also maintaining a suitable combination of mechanical and physical properties, such as tensile strength and ductility or elongation. It is also desirable to affect the necessary improvements while minimizing the amount of additional hard particle powder materials used, since these materials frequently have an associated cost that is greater than the cost of the alloy powders they replace in the sintered bearing material.

SUMMARY OF THE INVENTION

This invention provides improved wear resistance for bushings or bearings. The base material, a copper-tin-bismuth alloy with added phosphorus, described in detail in the Applicant's U.S. Pat. No. 6,746,154, has excellent strength, due to the solid solution of copper, tin and phosphorus. The material also has good lubricity as a result of the presence of the bismuth and the associated tin migration that occurs during bearing use. In some instances, however, an unusual set of operating circumstances can result in very fast and excessive wear. These circumstances relate to the matching of the surfaces of the bushing and the mating pin or journal, wherein bushing wear can occur more rapidly than the above described tin migration can occur. The addition of small amounts of relatively small hard particles, particularly $Fe_3P$, $MoSi_2$ or a mixture thereof as described herein provides a suitable hard surface artifact to polish the pin or journal and thus greatly reduces the total wear, particularly early wear associated with matching the bearing surfaces as described above.

In one aspect, the invention is a bearing comprising a sintered powder compact bearing material of a copper-tin-bismuth alloy powder and a metal compound powder which is bonded to a steel backing shell, wherein the metal compound powder has an average particle size of less than 10 μm.

In another aspect, the metal compound powder is selected from a group consisting of metal boride, metal silicide, metal oxide, metal nitride, metal carbide, metal phosphide and intermetallic compounds. Metal compound powders may include $Fe_3P$, $MoSi_2$ or a mixture of them.

In another aspect, the metal compound powder comprises 0.1-10% by volume of the sintered powder compact.

In another aspect, the copper-tin-bismuth alloy powder may include, by weight, 8-15% tin, 1-30% bismuth and the balance essentially copper, and more particularly 8-12% tin, 1-<5% bismuth and the balance essentially copper. The copper-tin-bismuth alloy powder may include either a gas atomized powder or a water atomized powder, and more particularly may include a mixture of a gas atomized powder and a water atomized powder.

In another aspect, the copper-tin-bismuth alloy powder may also include phosphorus, and more particularly, by weight, 0.03-0.8% of the copper-tin-bismuth alloy powder, and even more particularly, by weight, 0.03-0.08% of the copper-tin-bismuth alloy powder.

In another aspect, the invention is a bearing which includes a sintered powder compact of a copper-tin-bismuth alloy powder, an $Fe_3P$ powder and an $MoSi_2$ powder which is bonded to a steel backing shell.

In another aspect, the $Fe_3P$ powder and the $MoSi_2$ powder together comprise 0.1-10% by volume of the sintered powder compact.

In another aspect, the $Fe_3P$ powder and the $MoSi_2$ powder each have an average particle size of less than 10 μm.

In another aspect, the invention includes a method of making a bearing including the steps of: applying a mixture of a copper-tin-bismuth alloy powder and a metal compound powder having an average particle size of less than 10 μm to a steel backing shell; heating the powder mixture and steel backing shell to produce a sintered powder mixture and bond the sintered powder mixture to the steel backing shell; and rolling the sintered powder mixture and steel backing shell to reduce a porosity of the sintered powder and to produce a fully-dense, sintered compact bearing material.

In another aspect, the invention includes a step of heating the fully dense bearing to promote inner diffusion within the bearing material at sites associated with the porosity.

In another aspect, the invention includes a method of making a bearing including the steps of: applying a mixture of a copper-tin-bismuth alloy powder, an Fe₃P powder and an MoSi₂ powder to a steel backing shell; heating the powder mixture and steel backing shell to produce a sintered powder mixture and bond the sintered powder mixture to the steel backing shell; and rolling the sintered powder mixture and steel backing shell to reduce the porosity of the sintered powder and produce a fully dense sintered compact bearing material.

BRIEF DESCRIPTION OF THE DRAWINGS

These and other features and advantages of the present invention will become more readily appreciated when considered in connection with the following detailed description and appended drawings, wherein like elements have like reference numerals throughout:

FIG. 9 is an optical photomicrograph of the bearing material LFC-63;

FIG. 10 is a secondary electron photomicrograph of the bearing material of FIG. 9;

FIG. 11 is a back scatter electron photomicrograph of the bearing material of FIG. 9;

FIG. 12 is an optical photomicrograph of the bearing material LFC-64;

FIG. 13 is a secondary electron photomicrograph of the bearing material of FIG. 12;

FIG. 14 is a back scatter electron photomicrograph of the bearing material of FIG. 12;

FIG. 15 is an optical photomicrograph of the bearing material LFC-65;

FIG. 16 is a secondary electron photomicrograph of the bearing material of FIG. 15;

FIG. 17 is a back scatter electron photomicrograph of the bearing material of FIG. 15;

FIG. 18 is an optical photomicrograph of the bearing material LFC-66;

FIG. 19 is a secondary electron photomicrograph of the bearing material of FIG. 18;

FIG. 20 is a back scatter electron photomicrograph of the bearing material of FIG. 18.

DETAILED DESCRIPTION OF THE PREFERRED EMBODIMENT

Figure 1:
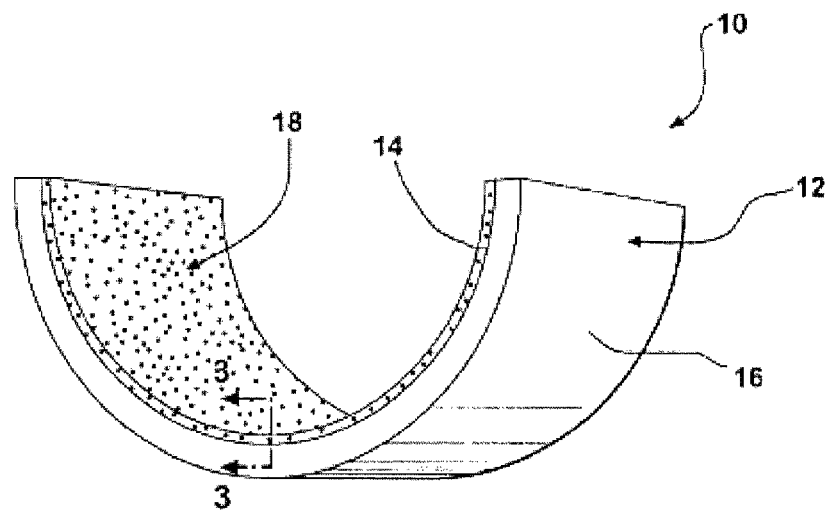
FIG. 1 is a schematic perspective view of an engine bearing constructed according to the present invention.
Figure 2:
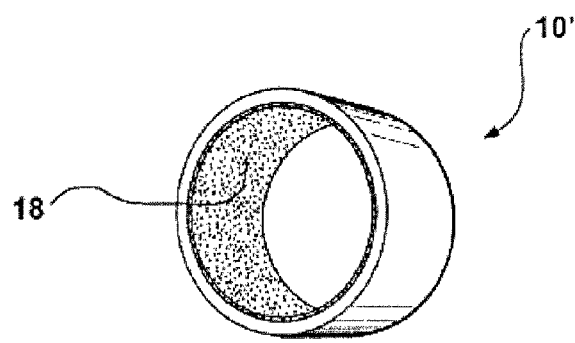
FIG. 2 is a perspective view of a pin bushing constructed according to the invention.

Referring to the FIGURES, wherein like numerals indicate like or corresponding parts throughout the several views, a bearing constructed according to the present invention is shown generally at 10 in FIG. 1 in the form of an engine bearing, and at 10' in FIG. 2 which represents a pin bushing such as that used in the small end opening of a connecting rod for journaling a wrist pin of a piston. For simplicity, the remainder of the description will be made in reference to the engine bearing 10, but it is to be understood that the description is equally applicable to the pin bushing 10'.

The engine bearing 10 is of the type comprising a half shell used in combination with a counterpart half shell bearing in an engine, or the like, to journal a rotating shaft, such as the crankshaft of an engine. The bearing 10 has a steel backing shell 12 having a concave inner surface 14 and a convex outer surface 16. Bearing material 18 is applied to the inner surface 14 as a loose powder mixture of a copper-tin-bismuth alloy powder and hard particle powder and is sintered and rolled to form a sintered powder compact. The copper-tin-bismuth alloy bearing material 18 is lead-free. By lead-free, it is meant that the bearing material contains either none or only incidental amounts of lead due to impurities (i.e., less than about 0.5% by weight).

The bearing material 18 is fabricated of a copper-tin-bismuth alloy powder, or blend of copper-tin-bismuth alloy powders, that also includes at least one hard particle powder, and preferably at least two hard particle powders. The at least one hard particle powder is a metal compound powder in an amount of 0.1-10%, by volume, of bearing material 18 and the sintered compact and has an average particle size of less than 10 μm. While 0.1-10% by volume of the metal compound powder is believed to represent the broadest range of this material, 0.5-5% by volume of this material is believed to represent a more preferred range and 1-2% by volume is a most preferred range of this material. It is believed that the metal compound powder may be selected from a group consisting of a metal boride, metal silicide, metal oxide, metal nitride, metal carbide, metal phosphide and intermetallic compound, and that the metal compound powder may also include various mixed metal compounds of these materials, such as various metal oxynitrides, metal carbonitrides, metal carboxynitrides, metal oxycarbides and the like. Applicants have determined that either of Fe₃P and MoSi₂ are suitable for use as the metal compound in the amounts and sizes indicated above, with MoSi₂ being somewhat preferred in that it has produced somewhat superior wear resistance and ductility, but with Fe₃P generally being somewhat preferred with regard to its relatively lower cost. However, it is believed to be even more preferred to use a mixture of Fe₃P and MoSi₂ in the amounts and sizes described above to exploit the advantages of both materials. The use of hard particles in these amounts and sizes, particularly of Fe₃P or MoSi₂, and more particularly as a mixture of Fe₃P and MoSi₂, has not been discussed in the related art patents and publications.

Importantly, the copper, tin and bismuth are alloyed together prior to forming the copper-tin-bismuth powder in contrast to other copper-tin-bismuth alloy bearings that have been reported earlier using a mixture of pure metal powders of each of these constituents, as Applicants have observed, consistent with what has been reported in GB2355016, that the use of pure metal powders to make the sintered bearing material increases the tendency for the hard particles described herein to be preferentially located in or proximate to the bismuth phase. The use of copper-tin-bismuth alloy powders to make sintered compacts of the invention has been observed to produce compacts where the hard particles are generally evenly distributed throughout the alloy microstructure, particularly within the copper-tin matrix. While some hard particles have been observed in the bismuth phase, as would be expected assuming a generally homogeneous distribution of the copper-tin-bismuth alloy particles and the metal compound particles, preferential incorporation of the hard particles in the bismuth phase has not been noted. The alloying done prior to forming the copper-tin-bismuth powder may include alloying together all of the desired alloy constituents, such that a single powder may be formed, preferably as a water atomized or gas atomized powder, or more preferably as a mixture of gas atomized and water atomized powders. However, the invention and the references herein to copper-tin-bismuth powders also contemplates alloying together of certain combinations of constituents to form alloy powders which may then be mixed together to achieve the desired alloy composition of the sintered compact, such as by separately forming copper-tin alloy and copper-bismuth alloy powders and then mixing them together prior to sintering, as described in U.S. Pat. No. 6,746,154 and such that pure bismuth powder is not used. When different alloy powders are used, they may also be formed as gas atomized and water atomized powders. The hard particle powder is mixed with the copper-tin-bismuth alloy powder in the amounts described above using known mixing methods to form the bearing material 18.

The mixture of copper-tin-bismuth powder and hard particle powder used to form metal bearing material 18 is sintered and bonded to the steel backing shell 12 to provide a lining of the copper-tin-bismuth bearing material which contains hard particles dispersed therein, particularly within the copper-tin alloy matrix, against the inner surface 14 of the backing shell 12. As is known generally to those skilled in the bronze bearing art, including bronze-bismuth bearings, the technique used to bond the copper-tin-bismuth alloy powder with the dispersed hard particles as the bearing material 18 to the steel backing shell 12 involves applying the bearing material 18 in loose powder form to the inner surface 14, after which the powder bearing material is heated, sintered and rolled to develop essentially a porosity-free, fully densified layer of the bearing material 18 which is permanently metallurgically bonded and united to the steel backing shell 12 to form a united multi-layer bearing structure. By fully dense, it is meant that the powder bearing material 18 is compressed and sintered to near fully theoretical density to form a sintered compact that is substantially impervious to oil or other substances in contrast to porous, oil-retaining bronze bearings to which this invention is not directed. Accordingly, it will be understood that fully dense or nearly fully dense means the bearing material 18 has a density exceeding 99% of full theoretical density, and preferably greater than 99.5%, and still more preferably 99.9% or more. Following the step of rolling, it is preferred that the multi-layer bearing structure be heated again sufficiently (i.e., for a sufficient time and temperature) to promote inner diffusion within the bearing material 18 at sites associated with the porosity which was effectively closed by the rolling step. This step increases the strength of the bearing material 18 considerably by increasing the homogeneity of the microstructure and removing through inner diffusion what would effectively be a network of microcracks associated with the porosity which was closed by rolling.

Depending on the properties required in the bearing application, copper-tin-bismuth alloy powders having a range of alloy compositions are suitable for use to make the bearing material 18 of the invention. However, copper-tin-bismuth-phosphorus alloy powders are particularly useful in a number of bearing applications, since phosphorus additions strengthen the sintered compact. The copper-tin-bismuth or copper-tin-bismuth-phosphorus alloy powder bearing materials 18 contain, by weight, an amount of tin in the range of 8 to 15%, and more preferably 8 to 12%, and even more preferably 9 to 11%; an amount of bismuth of 1 to less than 5%, and more preferably 3 to 4%; and when present, an amount of phosphorus of 0.03 to 0.8% and more preferably 0.03 to 0.08%, with the balance of copper, allowing for incidental impurities. While having amounts greater than 0.5% phosphorus has been reported to promote embrittlement of copper-tin-bismuth alloy bearing materials, it is believed that having a greater amount of this material, such as 0.8% by weight, may be useful in conjunction with hard particles that are adapted to react with phosphorus, such as $MoSi_2$, as such materials by virtue of their reaction with the phosphorus will lower the amount of phosphorus in the copper-tin matrix to levels which are at or below 0.5% by weight. The amounts of phosphorus used in excess of 0.5% by weight for the purposes described above will depend upon the nature of the reaction with the metal compound used for the hard particles as well as the amount of hard particles that are used. Other alloying additions which do not impair the physical, tribological, wear or other properties of the bearing material, such as the mobilization of tin, may also be incorporated.

The bonded layer of bearing material 18 has a matrix 22 of copper and tin, with the tin being dissolved in solid solution in the copper. When present, the phosphorus is likewise in solid solution in the matrix. The bismuth has very low solubility in copper and exists as a distinct bismuth-rich phase 20 in the form of finely dispersed islands within the copper-tin or copper-tin-phosphorus matrix. The bismuth-rich phase 20 is dispersed substantially uniformly throughout the volume of the copper-tin matrix 22, as represented schematically in FIGS. 3 and 4.

As described in U.S. Pat. No. 6,746,154, when using a copper-tin-bismuth alloy powder in a sintered bearing according to the invention, bismuth serves as a substitute for lead, and has shown to provide additional properties not shared by lead when used in the controlled amount called for by the invention (i.e., between 1 to less than 5 weight percent). Roll bonded and sintered fully dense copper-tin-bismuth bearing material without the addition of hard particles has been shown to exhibit the following physical properties including a tensile strength greater than or equal to 400 MPa, a yield strength greater than or equal to 200 MPa, and elongation of greater than 10% and a hardness (HV) less than 130 (0.5/15).

These physical properties meet or exceed traditional copper-tin-lead engine bearings as discussed in the previous section. In addition, engine bearings constructed according to the invention have as good or better wear and seizure resistance properties as compared to traditional copper-tin-lead engine bearings. In a comparative engine test, engine bearing constructed according to the invention exhibited a loss of material of about 10 to 11 microns, whereas traditional copper-tin-lead bearings tested under the same conditions exhibited a loss of 12 microns, indicating about a 10% decrease in wear of copper-tin-bismuth bearings over traditional copper-tin-lead bearings.

In a study conducted on the copper-tin-bismuth bearing materials, it was surprisingly found that when engine bearings are prepared according to the invention within the limits set forth above, the exceptional physical properties are achieved that enable bearings constructed according to the invention to be substituted for those applications now or in the future calling for traditional copper-tin-lead engine bearings. Although not entirely understood, one of the key factors attributing to the remarkable physical properties is the presence of the phosphorus which is effective at degassing the alloy during melting and atomization into powder, and the fully dense roll bonding and sintering of the bearing material onto the backing 12. Additionally, the physical properties mentioned above as well as fatigue strength are maintained by controlling the amount of bismuth added to the alloy. If added in amounts of 5% or more, bismuth has the effect of weakening the matrix structure since it does not dissolve in the matrix 22 and the bismuth islands 20 amount, effectively, to bismuth-filled holes or pockets in the otherwise strong matrix. If too much bismuth is present, the islands (and thus the holes they fill) become too large and the desired physical properties of the material are lost. As such, the addition of bismuth in the range called for by the invention and recited above has been shown not to reduce the physical properties of the matrix below that which is desired for engine bearing applications.

Figure 3:
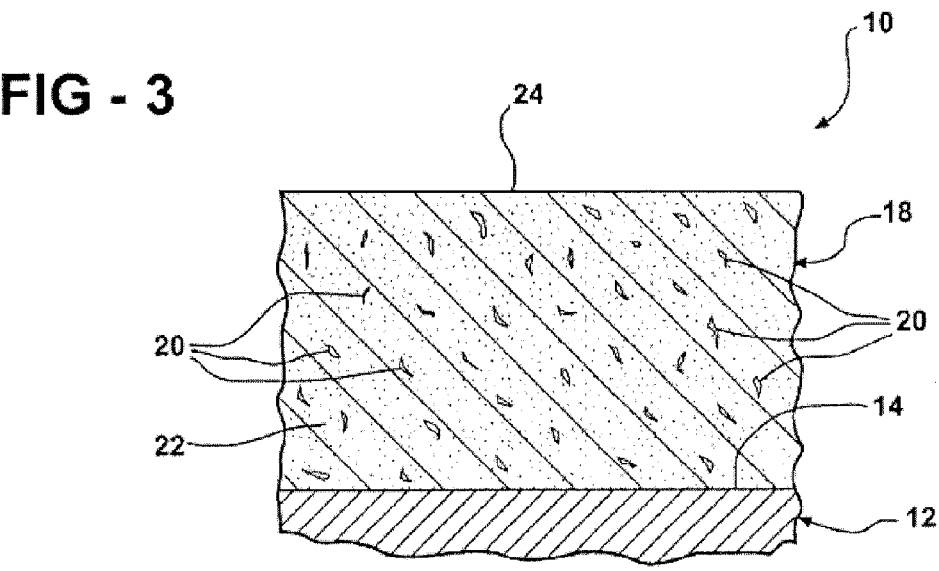
FIG. 3 is an enlarged fragmentary cross-sectional view of a bearing according to the invention in its manufactured, but pre-use, condition.
Figure 4:
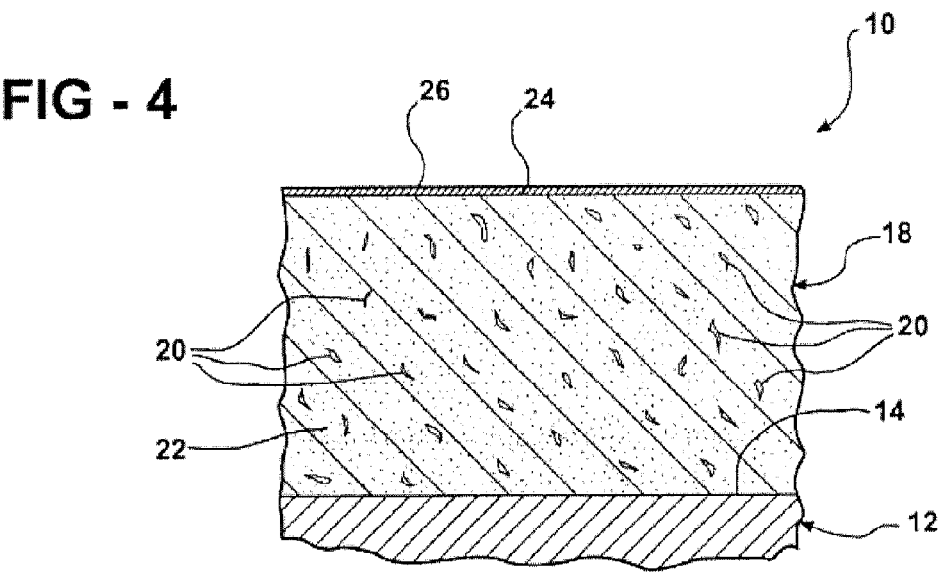
FIG. 4 is a view like FIG. 3 but showing the bearing following a period of use in service.

Bismuth has also surprisingly been shown to have a very desirable, positive effect on the wear and seizure resistance properties of the bearing layer 18. As shown in FIG. 3, when the bearing 10 is manufactured and installed in an engine, the tin is fully dissolved in the copper to yield a uniform copper-tin matrix 22. However, it has been surprisingly found that during operation when a frictional compressive sliding load is applied to the exposed bearing surface 24 of the bearing layer 18, a certain amount of tin in the matrix is caused to migrate through the matrix into the bearing surface 24, developing a tin-rich layer 26 at the bearing surface 24 as illustrated in FIG. 4. This tin-rich layer 26 serves as a lubricant at the bearing surface 24 and has the effect of reducing the wear and seizure resistance of the overall bearing 10. As the bearing 10 wears, the bearing material 18 has the characteristic of continuously replenishing the tin-rich layer, such that the layer 26 is always present and developing due to the mobilization of the tin in the matrix 22. The mobilization of the tin is believed to result from a reaction between the tin in solution and the bismuth under the load/friction conditions of bearing usage. The presence of the bismuth in combination with the fully dense powder metal structure of the matrix 22 provides the vehicle for transporting the tin from the matrix to the surface 24 in development of the tin-rich layer 26. Since the copper-tin-bismuth bearing material 18 has the characteristic of developing its own tin-rich layer 26 at the bearing surface 24, there is generally no need to apply a flash coating of tin or other tin overlay to the bearing material 18, as is often applied to bronze-lead engine bearings of the traditional type mentioned above. The bearing layer 18 of the invention which also includes hard particles in the amounts described herein has also been observed to exhibit tin mobilization as described above comparable to that which has been observed in alloys in copper-tin-bismuth alloys which do not include hard particles.

By way of comparison, the tin mobility is not known to exist in copper-tin-lead bearings. Tests were also conducted on a copper-tin-nickel alloy and likewise no tin mobilization was found to be present. Only bismuth, in the amount specified by the invention, has shown to provide tin mobilization to improve wear and seizure characteristics while not unduly inhibiting the physical properties of the copper-tin matrix.

As noted previously, test specimens were similarly prepared from comparable copper-tin-bismuth compositions made up of only gas atomized powder and another set of test specimens made up of only water atomized powder, but of comparable composition to the gas/water blend of the first test specimens. It was surprisingly found that the gas/water atomized blend had significantly improved physical properties as compared to the test specimens of comparable compositions made from either 100% gas atomized or 100% water atomized powder. The improved physical properties include yield strength, tensile strength, ductility, hardness and seizure resistance; all of which play an important role in copper-based sintered powder metal bushing and bearing applications.

Applicants have observed that the advantages and improvements described above that are associated with the use of copper-tin-bismuth alloy bearing materials are also generally characteristic of, and even improved by, bearing materials of the invention that also include hard particles. For example, the wear resistance is improved and the tin mobility and lubricity associated with the bismuth are also observed in bearing materials of the invention. Some differences have been noted, such as a general reduction of the tensile strength and elongation, but these properties are still generally sufficient to provide a bearing material having suitable strength and ductility for many bearing applications, including main engine bearings for internal combustion engines.

The bearing materials of the invention are further described below with regard to several examples, including comparative examples. Applicants have fabricated several bearing materials of the invention for evaluation, including metallographic and scanning electron microscope evaluation of the resultant microstructures, measurement of porosity, and well as wear testing.

EXAMPLE

The samples made were of engine bearings main bearings. The copper-tin-bismuth powder used was as described generally herein and in U.S. Pat. No. 6,746,154. The hard particles included $Fe_3P$ and $MoSi_2$ powder used individually and in combination in the amount and sizes described in Table 1.

TABLE 1

| Powder Mixtures | | | | |
|---|---|---|---|---|
| Alloy | LFC-63 | LFC-64 | LFC-65 | LFC-66 |
| LF-5 (Cu—Sn—Bi) Powder (wt. %) | 99 | 99 | 99 | 99 |
| $Fe_3P$ (wt. %)/(vol %) | 1/1.32 | 0/0 | 0.9/1.19 | 0.5/0.66 |
| $MoSi_2$ (wt. %)/(vol %) | 0/0 | 1/1.41 | 0.1/0.14 | 0.5/0.70 |
| Total | 100 | 100 | 100 | 100 |

The LF-5 used for samples LFC-63 through LFC-66 was a Cu—Sn—Bi alloy powder. That is, each of the constituents was added into a melt to form the alloy, which was then atomized to form the alloy powder. This material had the properties as shown in Tables 2 and 3 below.

TABLE 2

Chemistry of LF-5

| Sn | Bi | Pb | Ni | P | $O_2$ | Fe | Zn | Sb | Al | Si |
|---|---|---|---|---|---|---|---|---|---|---|
| 10.18 | 3.25 | 0.012 | 0.002 | 0.071 | 0.09 | 0.003 | 0.002 | 0.007 | <0.001 | 0.001 |

TABLE 3

Powder Properties of LF-5

| | Apparent | Sieve analysis (sieve sizes in microns) | | | | | |
|---|---|---|---|---|---|---|---|
| Flow time (s) | Density (g/ml) | +200 | −200 +180 | −180 +150 | −150 +125 | −125 +75 | −75 +45 | −45 |
| 12 | 5.65 | 0.00% | 0.00% | 0.55% | 3.48% | 21.99% | 30.14% | 43.84% |

The $Fe_3P$ powder used for samples LFC-63 through LFC-66 was purchased from F.W. Winter Co, grade FEP-R15-F4. The $Fe_3P$ powder had the chemical analysis and powder properties as shown in Table 4.

TABLE 4

Properties of the $Fe_3P$ Powder

| | | | | Size analysis (microns) | |
|---|---|---|---|---|---|
| P (%) | Si (%) | Mn (%) | C (%) | D50 | D90 |
| 15.15 | 0.01 | 0.4 | 0.25 | 6.4 | 2.4 |

Figure 5:
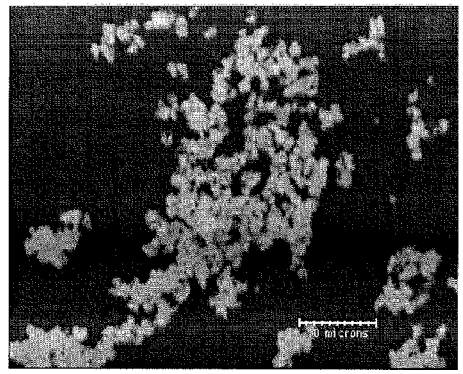
FIG. 5 is an SEM photomicrograph showing agglomerated Fe₃P particles.
Figure 6:
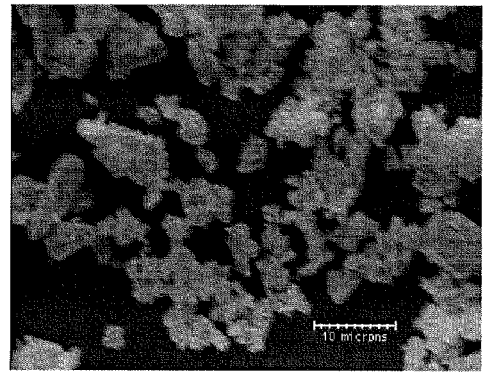
FIG. 6 is a second SEM photomicrograph of Fe₃P particles that are not agglomerated.

Scanning electron microscope (SEM) photographs of the $Fe_3P$ powder are shown in FIGS. 5 and 6 below. FIG. 5 reveals some agglomeration of the $Fe_3P$ particles, as compared to those shown in FIG. 6. It is believed to be desirable to use the $Fe_3P$ powder in the form shown in FIG. 6.

The LF-5 and $Fe_3P$ powders were blended together in a weight ratio of 400 pounds LF-5 and 4.0 pounds of $Fe_3P$ powder as hard particles to make sample LFC-63.

The blended loose powder mixture of LFC-63 was applied to several sample steel strips and sintered at 805° C. The porosity of the sintered strips was measured as shown in Table 5.

TABLE 5

Post-Sintering Porosity

| Sample | Average Porosity | Maximum Porosity |
|---|---|---|
| 1 | 0.6% | 1.5% |
| 2 | 1.1% | 2.7% |
| 3 | 0.7% | 1.5% |
| 4 | 0.5% | 1.4% |

Referring to FIG. 9, the photomicrographs of sample LFC-63 show darker gray areas ($Fe_3P$ particles) both adjacent to and independent from lighter gray bismuth phase. Note that the $Fe_3P$ particles appear to somewhat favor sites at the intersection of the bismuth phase and the bronze particle grain boundaries, possibly pinning the bismuth.

Referring to FIGS. 10 and 11, respectively, secondary electron (SE) and backscatter (BS) photographs of the microstructure clearly show the bismuth phase (white in the SE, dark in BS), while the $Fe_3P$ particles show as dark gray areas in the SE photograph and white areas in the BS photograph.

The lining of each sample of LFC 63 was analyzed for composition. The results are shown in the following Table 6.

TABLE 6

LFC-63 Chemistry

| Sample | Sn | Bi | Fe | P | Pb | Ni | Zn | Si | Mo |
|---|---|---|---|---|---|---|---|---|---|
| 1 | 9.98 | 2.78 | 0.96 | 0.20 | 0.01 | <0.01 | <0.01 | <0.01 | NA |
| 2 | 9.92 | 2.74 | 0.73 | 0.23 | 0.02 | <0.01 | <0.01 | <0.01 | <0.01 |
| 3 | 10.03 | 2.87 | 0.75 | 0.24 | 0.07 | <0.01 | <0.01 | <0.01 | <0.01 |
| 4 | 9.98 | 2.79 | 0.73 | 0.24 | 0.02 | <0.01 | <0.01 | <0.01 | <0.01 |

The hardness of the steel and lining were measured as shown in Table 7.

TABLE 7

LFC-63 Hardness

| Sample | Lining Hardness HR15T | Lining Microhardness HV500 | Steel Hardness HRB | Steel Microhardness HV1000 |
|---|---|---|---|---|
| 1 | 83.0 | 131 | 73.1 | 144 |
| 2 | 82.9 | 142 | 73.7 | 144 |
| 3 | 81.8 | 128 | 70.2 | 147 |
| 4 | 82.8 | 135 | 71.0 | 149 |

Tensile and yield properties were measured as shown in the following Table 8.

TABLE 8

LFC-63 Tensile/Yield Strength

| | Yield Strength | | Ultimate Tensile Strength | | |
|---|---|---|---|---|---|
| Sample | psi | MPa | psi | MPa | Elongation % |
| 1 | 48,000 | 331 | 49,900 | 344 | 1.2 |
| 2 | 48,500 | 335 | 48,500 | 338 | 1.3 |
| 3 | 49,000 | 338 | 50,000 | 345 | 1.0 |
| 4 | 48,700 | 336 | 49,900 | 344 | 1.0 |

The SEM analysis also indicated the presence of $Fe_3P$ in the copper matrix, in addition to being located in the bismuth phase.

The LF-5 and $MoSi_2$ powders were blended together in a weight ratio of 352 pounds of LF-5 and 3.52 pounds of $MoSi_2$ as hard particles to make sample LFC-64.

$MoSi_2$ powder may be purchased from ABCR GmbH & Co. KG. The $MoSi_2$ powder had the chemical analysis and powder properties as shown in Table 9.

TABLE 9

Properties of the $MoSi_2$ Powder

| Si (%) | C (%) | O (%) | N (%) | Surface area (m²/g) | App. Density (g/inch³)/ (g/ml) | Microtrac size analysis (microns) | | |
|---|---|---|---|---|---|---|---|---|
| | | | | | | D10 | D50 | D90 |
| 36.60 | 0.11 | 0.76 | 0.04 | 0.9 | 19.3/1.18 | 1.484 | 4.703 | 8.306 |

Figure 7:
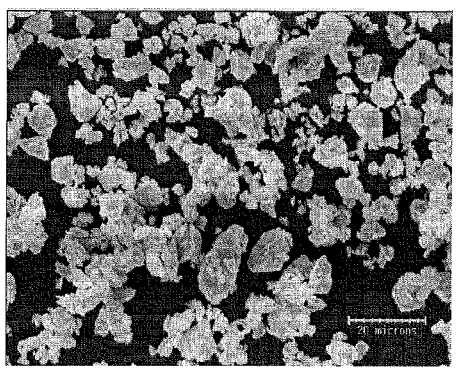
FIG. 7 is an SEM photomicrograph of MoSi₂ particles.
Figure 8:
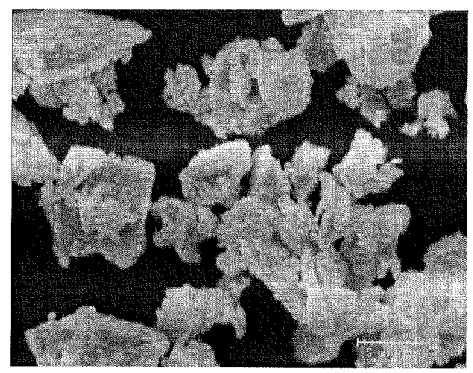
FIG. 8 is an SEM photomicrograph of the MoSi₂ particles of FIG. 7 taken at a higher magnification.

Scanning electron microscope (SEM) photographs of the $MoSi_2$ powder are shown in FIGS. 7 and 8 at two different magnifications. In contrast to the $Fe_3P$ particles, the $MoSi_2$ powder particles did not show evidence of agglomeration as may be seen in FIGS. 7 and 8. It is believed to be desirable to use the $MoSi_2$ powder in the form shown in FIGS. 7 and 8.

The blended loose powder mixture of LFC-64 was applied to several sample steel strips and sintered at 805° C.

The low magnification optical photomicrograph of the microstructure of the sample of LFC-64 material made according to this invention shows a significant number of dark areas that appear to be porosity. Under higher magnification as shown in FIG. 12, many of these dark areas are revealed to be small $MoSi_2$ particles. Because of this, image analysis techniques do not give an accurate measurement of the porosity. As may be seen in FIG. 12, the microstructure shows many dark areas, as well as gray secondary phase bismuth areas. The $MoSi_2$ particles are not generally adjacent to or associated with the bismuth phase, although they do appear to be well distributed along the grain boundaries of the Cu matrix.

Referring to FIGS. 13 and 14, respectively, secondary electron (SE) and backscatter (BS) photographs of the microstructure clearly show the bismuth phase (white in the SE, dark in BS), while the $MoSi_2$ particles show as dark gray in the SE and either light gray or white areas in the BS photomicrograph. White areas are higher in Si than the light gray areas.

The lining of each sample of LFC 64 was analyzed for composition. The results are shown in the following Table 10.

TABLE 10

LFC-64 Chemistry

| Sample | Sn | Bi | Mo | Si | P | Pb | Ni | Fe | Zn |
|---|---|---|---|---|---|---|---|---|---|
| 1 | 9.97 | 2.93 | 0.60 | 0.30 | 0.07 | <0.01 | <0.01 | <0.01 | NA |
| 2 | 9.87 | 2.69 | 0.60 | 0.30 | 0.06 | <0.01 | <0.01 | <0.01 | <0.01 |
| 3 | 9.43 | 2.22 | 0.56 | 0.32 | 0.09 | <0.01 | <0.01 | <0.01 | <0.01 |
| 4 | 9.73 | 2.90 | 0.59 | 0.32 | 0.10 | <0.01 | <0.01 | <0.01 | <0.01 |

The hardness of the steel and lining were measured as shown in Table 11.

TABLE 11

LFC-64 Hardness

| Sample | Lining Hardness HR15T | Lining Microhardness HV500 | Steel Hardness HRB | Steel Microhardness HV1000 |
|---|---|---|---|---|
| 1 | 83.0 | 138 | 68.1 | 133 |
| 2 | 83.3 | 139 | 70.2 | 137 |
| 3 | 82.1 | 135 | 70.4 | 135 |
| 4 | 83.4 | 142 | 69.6 | 136 |

Tensile and yield properties were measured as shown in the following Table 12.

TABLE 12

LFC-63 Tensile/Yield Strength

| | Yield Strength | | Tensile Strength | | |
|---|---|---|---|---|---|
| Sample | psi | MPa | psi | MPa | Elongation % |
| 1 | 52,900 | 365 | 58,300 | 402 | 4.1 |
| 2 | 55,400 | 382 | 60,900 | 420 | 3.1 |
| 3 | 52,000 | 358 | 57,000 | 393 | 3.6 |
| 4 | 56,400 | 389 | 62,100 | 428 | 2.3 |

The LF-5, $Fe_3P$ and $MoSi_2$ powders were blended together in a weight ratio of 247.5 pounds LF-5, 22.5 pounds of $Fe_3P$ and 2.5 pounds of $MoSi_2$ powder as hard particles to make sample LFC-65, and a weight ratio of 247.5 pounds LF-5, 12.5 pounds of $Fe_3P$ and 12.5 pounds of $MoSi_2$ powder as hard particles to make sample LFC-66. The same $Fe_3P$ and $MoSi_2$ powders used to make LFC-63 and LFC-64, respectively, were used to make LFC-65 and LFC-66

The blended loose powder mixture of LFC-63 was applied to several sample steel strips and sintered at 805° C.

The LFC-65 and LFC-66 bearing materials have not yet been tested for hardness, tensile and yield strength, wear resistance and alloy chemistry, but it is anticipate that they will have values for these properties intermediate those of LFC-63 and LFC-64.

Referring to FIG. 15, the photomicrographs of the samples of LFC-65 show darker gray areas ($Fe_3P$ and $MoSi_2$ particles) in, adjacent to and independent from the lighter gray bismuth phase. Applicants have observed that when hard particles occur in the bismuth phase that they tend to be $Fe_3P$ particles. As was the case with LFC-64, the $MoSi_2$ particles tend to be located in the grain boundaries, but do not tend to be found in the bismuth phase Referring to FIGS. 16 and 17, respectively, secondary electron (SE) and backscatter (BS) photographs of the microstructure clearly show the bismuth phase (white in the SE, dark in BS), while the $Fe_3P$ particles show as dark gray areas in the SE photograph and white areas in the BS photograph. The $MoSi_2$ particles are not present in the field of view in FIGS. 16 and 17, which is not surprising in that there is only 0.1 weight percent of these particle in LFC-65.

Referring to FIG. 15, the photomicrographs of the samples of LFC-65 show darker gray areas ($Fe_3P$ and $MoSi_2$ particles) in, adjacent to and independent from the lighter gray bismuth phase. Applicants have observed that when hard particles occur in the bismuth phase that they tend to be $Fe_3P$ particles. As was the case with LFC-64, the $MoSi_2$ particles tend to be located in the grain boundaries, but do not tend to be found in the bismuth phase Referring to FIGS. 16 and 17, respectively, secondary electron (SE) and backscatter (BS) photographs of the microstructure clearly show the bismuth phase (white in the SE, dark in BS), while the $Fe_3P$ particles show as dark gray areas in the SE photograph and white areas in the BS photograph. The $MoSi_2$ particles are not present in the field of view in FIGS. 16 and 17.

Referring to FIG. 18, the photomicrographs of the samples of LFC-66 show darker gray areas ($Fe_3P$ and $MoSi_2$ particles) in, adjacent to and independent from the lighter gray bismuth phase. Applicants have observed that when hard particles occur in the bismuth phase that they tend to be $Fe_3P$ particles. As was the case with LFC-64, the $MoSi_2$ particles tend to be located in the grain boundaries, but do not tend to be found in the bismuth phase Referring to FIGS. 19 and 20, respectively, secondary electron (SE) and backscatter (BS) photographs of the microstructure clearly show the bismuth phase (white in the SE, dark in BS) which is designated with the reference numeral 3, while the $MoSi_2$ particles show as dark gray areas in the SE photograph and lighter gray or white areas in the BS photograph and are designated with the reference numeral 2. These materials were identified using Energy Dispersive X-ray analysis (EDX). Surprisingly, these photomicrographs also reveal the presence of a molybdenum phosphorus compound ($MoP_x$) which is designated with the reference numeral 1. This may be evidence of a reaction between the $MoSi_2$ particles and the phosphorus found either in the alloy matrix or in an adjacent $Fe_3P$ particle.

Applicants have observed the surprising development that the addition of small amounts, less than one percent, of $MoSi_2$ particles significantly improves the formability and manufacturability of the bearing as was the case with LFC-64 through LFC-66. These materials have been observed to be less susceptible to transverse cracking during the step of rolling than the LFC-63 material, with the materials with greatest amounts of $MoSi_2$ being least susceptible to transverse cracking. As may be seen from comparison of the tabular data from LFC-63 and LFC-64, the elongation of the LFC-64 is significantly greater than that of the LFC-63. This enhanced ductility is also believed to be associated with the transverse cracking phenomenon. The addition of even relatively small amounts of $MoSi_2$ particles seems to have a significant affect on properties that are very important to the manufacturing of the bearings.

Figure 21:
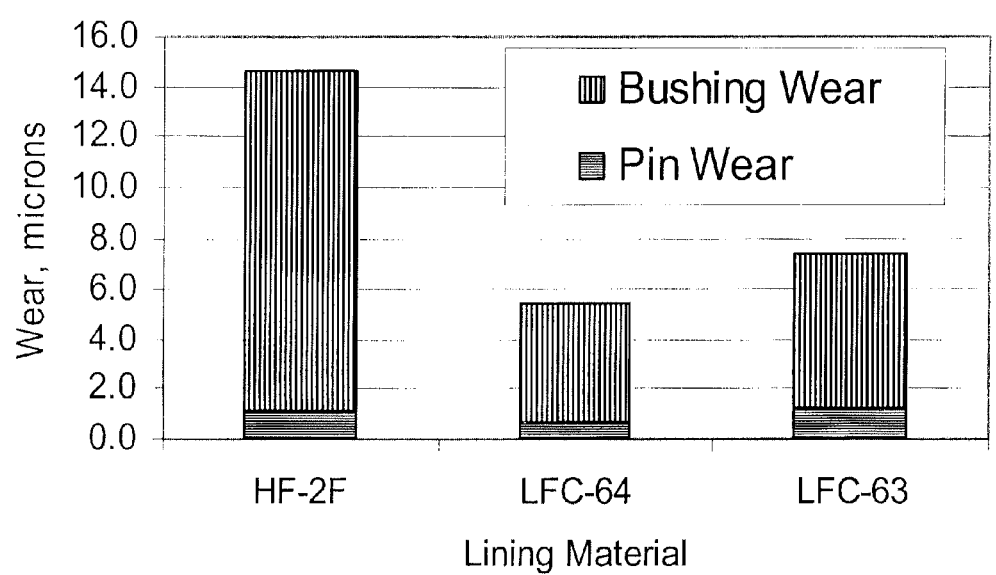
FIG. 21 is a plot of the wear performance of several bearing materials of the invention and a comparative bearing material.

Referring to FIG. 21, the engine wear performance of LFC-63 and LFC-64 is plotted, together with comparative wear data from another alloy, namely a conventional copper-10 weight % tin-10 weight % lead bearing alloy (HF-2F). The results indicate a significant increase in wear resistance associated with the addition of hard particles, with a somewhat greater improvement associated with $MoSi_2$ particle additions into somewhat lesser improvement observed with the addition of $Fe_3P$ of particle additions. However, the improvement associated with the addition of either $MoSi_2$ or $Fe_3P$ particles was significant. The copper-tin-lead bearing alloy was used to assess the improvement in wear resistance associated with incorporation of hard particles. Given the comparable significant or slightly improved performance of copper-tin-bismuth alloys as compared to copper-tin-lead alloys with respect to wear resistance, comparable wear resistance improvements for bearing materials of the invention that incorporate hard particles would also be expected as compared to copper-tin-bismuth alloy bearing materials that do not incorporate hard particles.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A method of making a bearing comprising the steps of:
applying a mixture of a copper-tin-bismuth alloy powder and a metal compound powder having an average particle size of less than 10 µm to a steel backing shell, the metal compound powder including an $Fe_3P$ powder and an $MoSi_2$ powder;
heating the powder mixture and steel backing shell to produce a sintered powder mixture and bond the sintered powder mixture to the steel backing shell; and
rolling the sintered powder mixture and steel backing shell to reduce a porosity of the sintered powder mixture and produce a fully-dense sintered compact bearing material, wherein the copper-tin-bismuth alloy of the sintered powder mixture includes a matrix of copper and tin and including bismuth in the form of islands spaced from one another by the matrix and the compound metal powder is dispersed throughout the matrix.

2. The method of claim 1, further comprising a step of heating the sintered compact bearing material sufficiently to promote interdiffusion within the bearing material at sites associated with the porosity.

3. The method of claim 2, further comprising a step of running-in the bearing sufficiently to produce a tin-rich surface layer.

4. The method of claim 1, wherein said copper-tin-bismuth alloy powder comprises, by weight: 8-12% tin, 1-<5% bismuth, and the balance essentially copper.

5. A method of making a bearing comprising the steps of:
applying a powder mixture of a copper-tin-bismuth alloy powder, an $Fe_3P$ powder and an $MoSi_2$ powder to a steel backing shell;
heating the powder mixture and steel backing shell to produce a sintered powder mixture and bond the sintered powder mixture to the steel backing shell; and
rolling the sintered powder mixture and steel backing shell to reduce a porosity of the sintered powder mixture and produce a fully dense sintered compact bearing material.

6. The method of claim 5, further comprising a step of heating the sintered compact bearing material sufficiently to promote interdiffusion within the bearing material at sites associated with the porosity.

7. The method of claim 6, further comprising a step of running-in the bearing sufficiently to produce a tin-rich surface layer.

8. The method of claim 5, wherein said $Fe_3P$ powder and said $MoSi_2$ powder together comprise 0.1-10% by volume of said compact.

9. The method of claim 5, wherein said $Fe_3P$ powder and said $MoSi_2$ powder each have an average particle size of less than 10 µm.

10. The method of claim 5, wherein said copper-tin-bismuth alloy comprises, by weight: 8-12% tin, 1-<5% bismuth and the balance essentially copper.

11. The method of claim 10, further comprising phosphorus as an alloy constituent of the copper-tin-bismuth alloy powder.

12. The method of claim 11, wherein the phosphorus comprises, by weight, 0.03-0.8% of the copper-tin-bismuth alloy powder.

13. The method of claim 12, wherein the $MoSi_2$ comprises 0.1-0.5% by weight of the powder mixture.

14. The method of claim 11, wherein the sintered compact bearing material comprises a molybdenum phosphorus compound as a reaction product of said MoSi2 powder and at least one of the $F_3P$ powder or the phosphorus.

* * * * *